United States Patent
Kubo

(10) Patent No.: US 7,925,301 B2
(45) Date of Patent: *Apr. 12, 2011

(54) PORTABLE TELEPHONE SET WITH A CARD INSERTED THROUGH A BATTERY HOLDING SPACE

(75) Inventor: Hiroshi Kubo, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/414,449

(22) Filed: Apr. 15, 2003

(65) Prior Publication Data

US 2003/0195020 A1 Oct. 16, 2003

Related U.S. Application Data

(62) Division of application No. 09/518,827, filed on Mar. 6, 2000, now Pat. No. 5,680,923, which is a division of application No. 09/017,395, filed on Feb. 2, 1998, now Pat. No. 6,101,372.

(30) Foreign Application Priority Data

Jun. 3, 1997 (JP) ...................................... 9-145407

(51) Int. Cl.
*H04M 1/00* (2006.01)
*H04B 1/38* (2006.01)
(52) U.S. Cl. .................... 455/558; 455/90.3; 455/575.1; 379/433.09; 361/814
(58) Field of Classification Search .................. 455/572, 455/575.1, 558, 550.1, 90.3, 347, 348, 349; 379/428.01, 433.01, 433.09; 361/737, 814
See application file for complete search history.

(56) References Cited

U.S. PATENT DOCUMENTS

| | | | | |
|---|---|---|---|---|
| 5,257,414 | A | * | 10/1993 | Trahan et al. ................. 455/558 |
| 5,331,123 | A | | 7/1994 | Kimbell et al. |
| 5,465,401 | A | * | 11/1995 | Thompson .................... 455/558 |
| 5,625,534 | A | | 4/1997 | Okaya et al. |
| 5,699,406 | A | | 12/1997 | Liikanen et al. |
| 5,790,659 | A | * | 8/1998 | Strand ...................... 379/433.09 |

FOREIGN PATENT DOCUMENTS

| | | |
|---|---|---|
| DE | 41 10 768 | 11/1992 |
| DE | 43 44 249 | 6/1995 |
| EP | 0 522 762 | 1/1993 |
| EP | 522762 A2 * | 1/1993 |
| EP | 0 684723 | 11/1995 |
| JP | 06-276263 | 9/1994 |
| JP | 08-087582 | 4/1996 |
| JP | 08-265404 | 10/1996 |
| JP | 08-279024 | 10/1996 |
| JP | 8-293350 | 11/1996 |
| WO | WO/90/13952 | 11/1990 |
| WO | WO 96/03810 | 2/1996 |

OTHER PUBLICATIONS

Japanese Office Action dated Sep. 14, 2004.

* cited by examiner

*Primary Examiner* — Quochien B Vuong
(74) *Attorney, Agent, or Firm* — Katten Muchin Roseman LLP

(57) ABSTRACT

A portable telephone set includes a case having first and second sides opposite to each other, a group of keys is located on the first side of the case, and a card loading mechanism. The case includes first and second portions located on the second side. The first portion can accommodate a battery pack, and the second portion is next to the first portion and accommodates the card loading mechanism. A card in which information is stored can be loaded to the card loading mechanism.

19 Claims, 15 Drawing Sheets

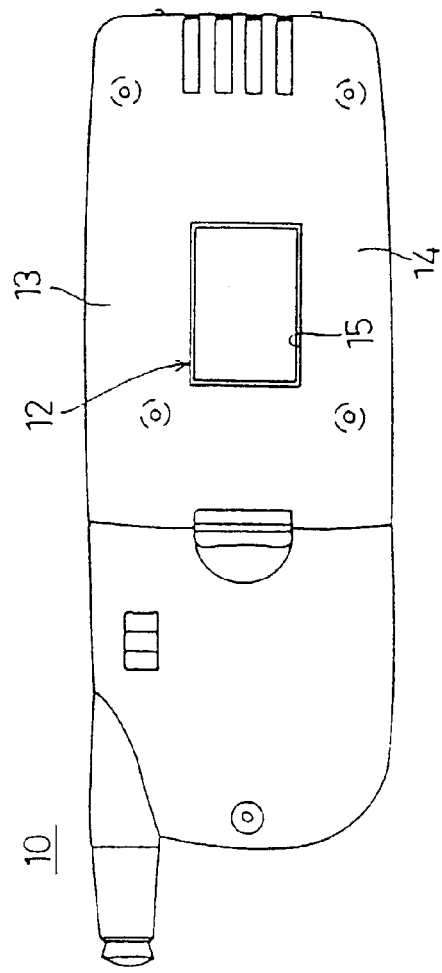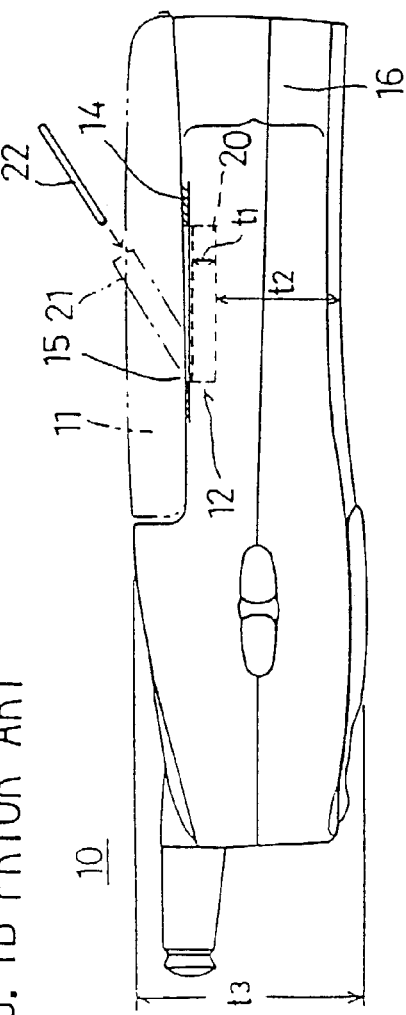
FIG. 1A PRIOR ART
FIG. 1B PRIOR ART

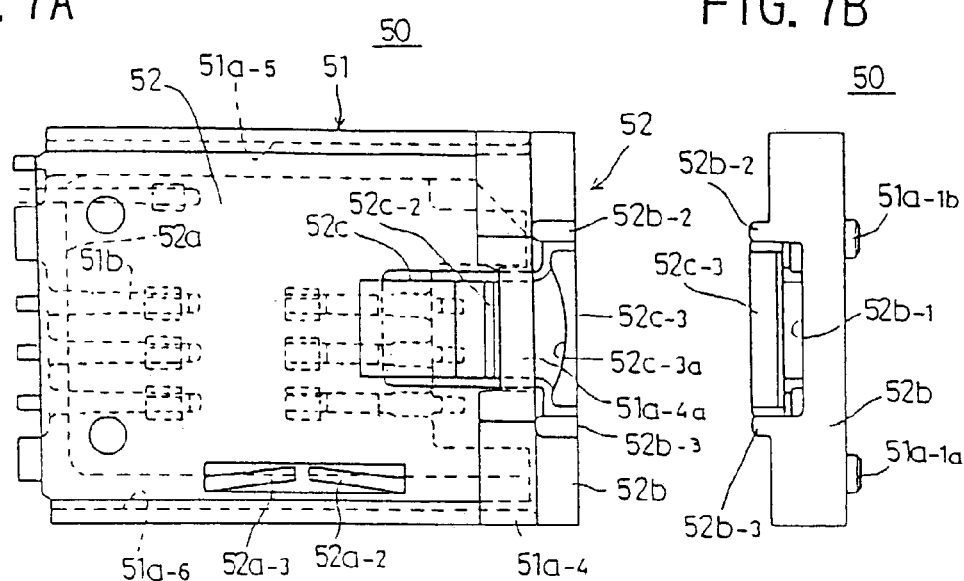
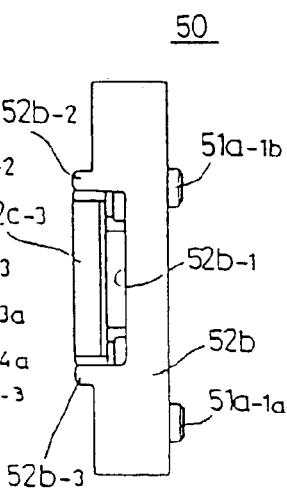
FIG. 7A  FIG. 7B
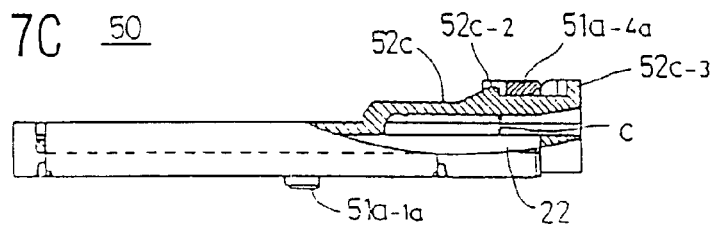
FIG. 7C
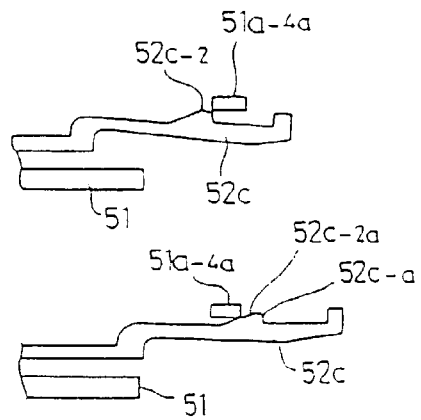
FIG. 7D
FIG. 7E FIG. 8A
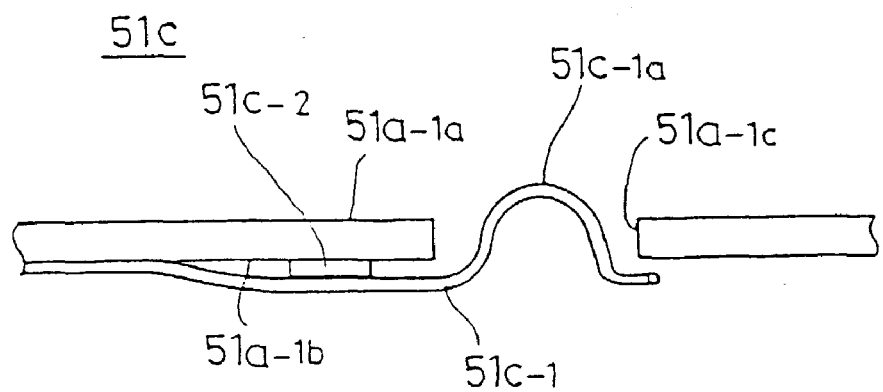
FIG. 8B
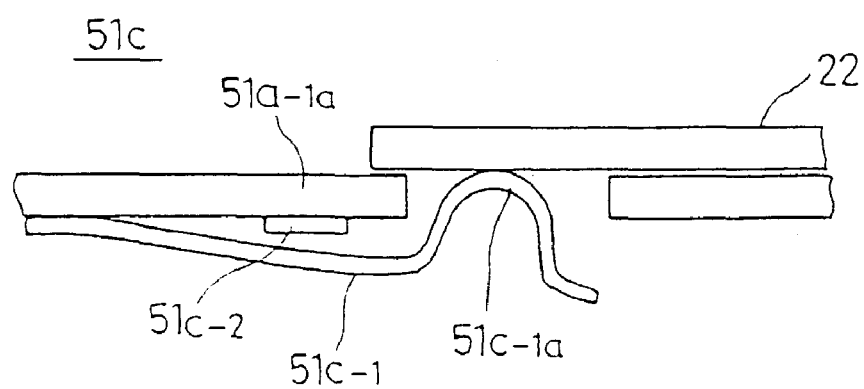
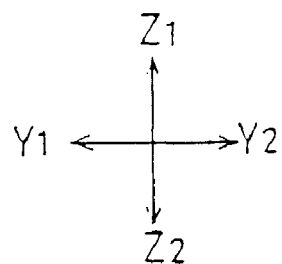

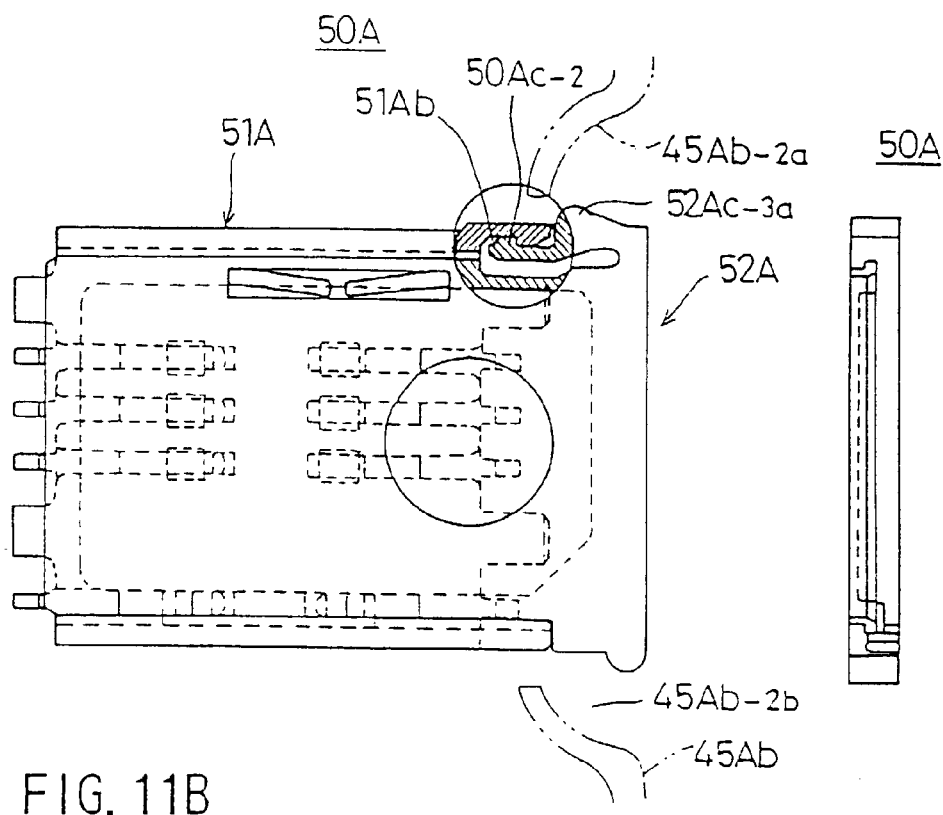
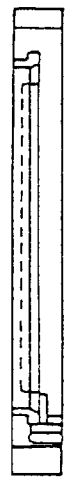
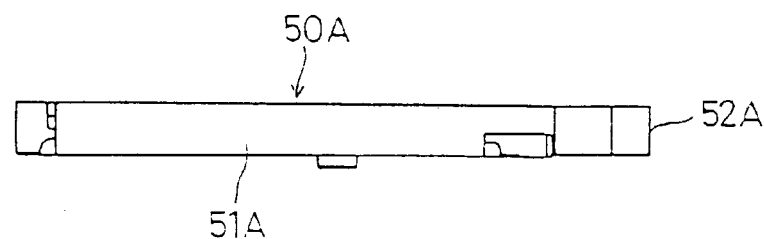

FIG. 14A
FIG. 14B
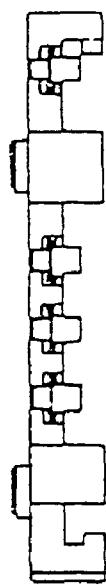
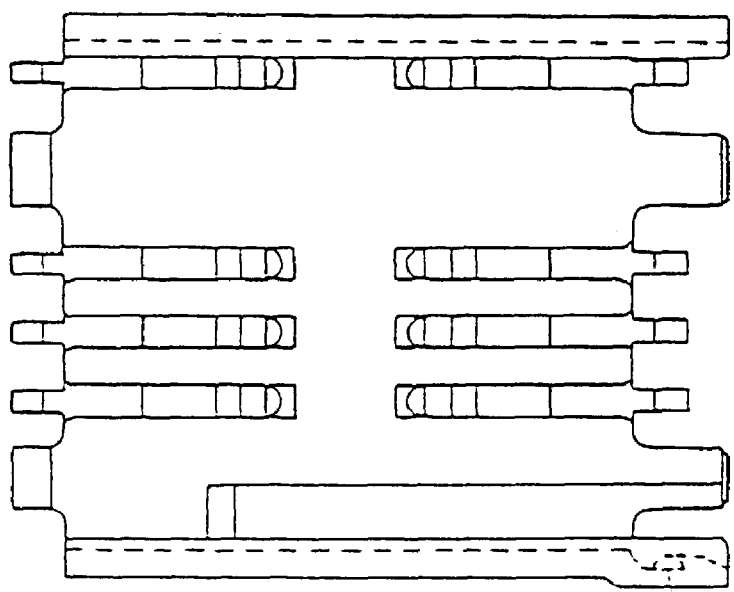
FIG. 14C
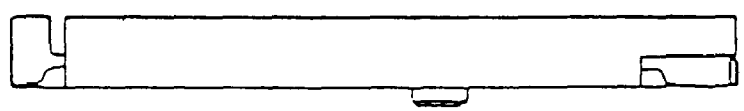

PORTABLE TELEPHONE SET WITH A CARD INSERTED THROUGH A BATTERY HOLDING SPACE

This application is a divisional of U.S. patent application Ser. No. 09/518,827, filed Mar. 6, 2000, allowed Jan. 28, 2003, which was a divisional of U.S. patent application Ser. No. 09/017,395 filed Feb. 2, 1998 now U.S. Pat. No. 6,101,372.

BACKGROUND OF THE INVENTION

1. Field of the Invention

The present invention relates to portable telephone sets, and more particularly to a portable telephone set suitable for a global system for mobile communication (GSM).

Recently, it has been considered in Japan to employ, as a communication system using portable telephone sets, the GSM which has been employed in Europe. The GSM does not require registration of a telephone number for each portable telephone set. Each individual (subscriber) is assigned to a subscriber identity module in which information concerning the subscriber is stored. If the subscriber exchanges the old portable telephone set by a new one, the subscriber identity module is detached from the old telephone set and is then inserted into the new one. If the rent portable telephone set is used, the subscriber inserts the own subscriber identity module into the set. Thus, the new or rent portable telephone set can be used as the subscriber own portable telephone set.

It has been considered that the subscriber identity module is realized by a compact subscriber identity card in which an integrated circuit including a memory is built. Such a card has a size of, for instance, 25 mm×15 mm.

The portable telephone set has been required to be thin and have a structure which enables the subscriber identity card to be easily detached therefrom.

There is another card which can be inserted into the portable telephone set. Such a card stores information important to the subscriber, such as subscriber identity information and accounting information. It is not desired to easily detach, from the portable telephone set, the information cards suitable for the portable telephone set as described above in terms of privacy protection. The portable telephone set is required to satisfy the above.

In the present specification, the cards to be attached to the portable telephone sets are referred to as portable telephone information cards. The portable telephone information cards include the above subscriber identity card, and another card which stores information other than the subscriber identity information.

2. Description of the Related Art

FIGS. 1A and 1B are diagrams of a portable telephone set 10 for the GSM disclosed in Japanese Laid-Open Patent Application No. 8-265404. A battery pack 11 can be attached to the back surface of the portable telephone set 10. A card loading mechanism 12 is provided in a bottom surface portion of a battery pack mount portion 13 provided to the back surface of the portable telephone set 10, that is, the back surface of the mounted battery pack 11. The battery pack mount portion 13 has a bottom plate 14, in which a rectangular opening 15 is formed.

The subscriber identity card loading mechanism 12 is mainly composed of a housing 20 and a holder 21. The housing 20 is fixed to the inside of the portable telephone set 10, and faces the opening 15. The holder 21 is joined to the housing by a hinge.

A subscriber identity card 22 can be mounted as follows. The holder 21 is rotated and set upright. Then, the subscriber identity card 22 is inserted into the holder 21, which is then depressed and rotated. Thus, the card 22 passes through the opening 15 and is engaged with the housing 20.

The subscriber identity card 22 can be taken out by the reverse operation. It should be noted that the subscriber identity card 22 which is mounted cannot be taken out unless the battery pack 11 is taken out.

The above portable telephone set 10 has the following problems.

The battery pack mount portion 13 located in the back surface of the portable telephone set 10 includes a slight recess. A circuit board, a tenkey and other components are tightly provided in a portion 16 opposite to the battery pack mount portion 13. Thus, no space is available in which a new mechanism is provided. The card loading mechanism 12 is provided in the above portion 16, and thus has an increased thickness t1. Hence, the thickness t3 of the portable telephone set 10 is equal to the sum of the thickness t2 necessary to provide the circuit board, the tenkey and other components and the thickness t1 of the card loading mechanism 12. The thickness t3 prevents down-sizing of the portable telephone set 10.

The holder 21 cannot be detached from the housing 20. Hence, it is necessary to take the portable telephone 10 by hand in order to take out the subscriber identity card 22 from the holder 21 and insert the subscriber identity card 22 into the holder 21. The above is troublesome. Further, the card loading mechanism 12 has a complex structure.

A detection switch detects the holder 21 even when the holder 21 having no card is mounted. Hence, if the subscriber dials with no card inserted into the holder 21, the portable telephone set 10 starts a corresponding calling procedure although it is not completed.

SUMMARY OF THE INVENTION

It is a general object of the present invention to provide a portable telephone set in which the above disadvantages are eliminated.

A more specific object of the present invention is to provide a compact portable telephone set having a simplified card loading mechanism.

The above objects of the present invention are achieved by a portable telephone set comprising: a case having first and second sides opposite to each other; a group of keys located on the first side of the case; and a card loading mechanism. The case includes first and second portions located on the second side. The first portion can accommodate a battery pack, and the second portion is next to the first portion and accommodates the card loading mechanism. A card in which information is stored can be loaded to the card loading mechanism. The card loading mechanism and the battery pack can be arranged side by side, so that the thickness of the portable telephone set can be reduced.

The above portable telephone set may be configured so that: the case has a wall interposed between the first and second portions; and the wall has an opening through which the card can be inserted into the second portion and loaded to the card loading mechanism. Hence, the card cannot be detached unless the battery pack is detached. Thus, it is possible to prevent the card from happening to be detached from the portable telephone set.

The portable telephone set may be configured so that the second portion includes a protrusion with respect to a bottom portion of the first portion. Such a protrusion means that there is a comparatively large spatial area in the portable telephone set. Hence, the card loading mechanism can be provided in the second portion without a particular difficulty.

The portable telephone set may be configured so that the card loading mechanism comprises: a housing located in the second portion; and a card holder having a card accommodating portion in which the card can be accommodated, the card holder having a spring portion which portion has a handle portion with which a finger can be engaged, and an engagement craw which can engage with a part of the housing when the card holder is inserted into the housing. A simple structure of the card loading mechanism can be realized.

The portable telephone set may be configured so that the spring portion is formed of a resin. Thus, the spring portion having a resilient property can be realized with ease.

The portable telephone set may be configured so that: the spring portion is formed of a resin and can be resiliently bent in a thickness direction of the portable telephone set; and the handle portion is located in a free end of the spring portion. The card holder can easily be drawn by a single-finger operation.

The portable telephone set may be configured so that: the spring portion is formed of a resin and can be resiliently bent in a thickness direction of the portable telephone set; the handle portion is located in a free end of the spring portion; and the card holder has another handle portion located opposite to the handle portion. The card holder can easily be drawn by using two fingers such as the thumb finger and the forefinger.

The portable telephone set may be configured so that: the card holder has a card holding portion having a spring property and projecting from a side of the card accommodating portion; and the card holding portion engages with a part of the card so that the card can be restricted in the second portion. The card holding portion of the card holder can certainly hold the card.

The portable telephone set may be configured so that the card loading mechanism comprises: a housing located in the second portion; a card holder having a card accommodating portion in which the card can be accommodated; and a detection switch which detects a situation in which the card holder with the card loaded thereto is inserted into the housing. Hence, even if the card holder with no card accommodated therein is loaded to the portable telephone set, the portable telephone set can be prevented from performing a meaningless or wasteful operation such as a calling procedure.

The portable telephone set may be configured so that the detection switch has a terminal having a spring property, the terminal which can be engaged with the card accommodated in the card holder. The same advantages as described above can be obtained.

The portable telephone set may be configured so that the card holder has a spring portion which portion has a handle portion with which a finger can be engaged, and an engagement craw which can engage with a part of the housing when the card holder is inserted into the housing. The card holding portion of the card holder can certainly hold the card.

The portable telephone set may be configured so that the card loading mechanism can receive the card in a state in which the battery pack is detached from the first portion. Hence, the card can be prevented from being drawn in the state in which the battery pack is attached to the portable telephone set.

BRIEF DESCRIPTION OF THE DRAWINGS

Other objects, features and advantages of the present invention will become more apparent from the following detailed description when read in conjunction with the accompanying drawings, in which:

FIGS. 1A and 1B are diagrams of a conventional portable telephone set;

FIGS. 7A, 7B, 7C, 7D and 7E are diagrams of the subscriber identity card holding mechanism to which a card is loaded;

FIGS. 8A and 8B are diagrams of a detection switch built in the portable telephone set;

FIGS. 11A, 11B and 11C show another subscriber identity loading mechanism;

FIGS. 14A, 14B and 14C are diagrams of a housing; and

DETAILED DESCRIPTION OF THE PREFERRED EMBODIMENTS

Figure 2A:
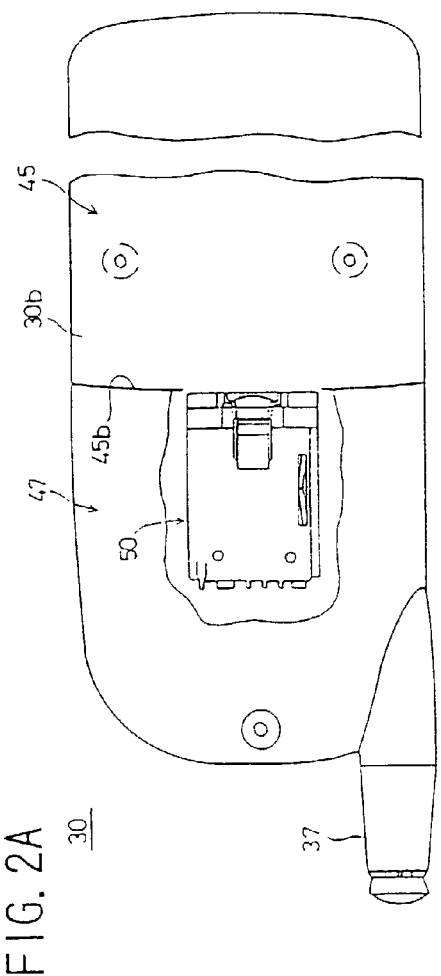
FIG. 2A is a partially-cutout plan view of a portable telephone set according to an embodiment of the present invention.
Figure 2B:
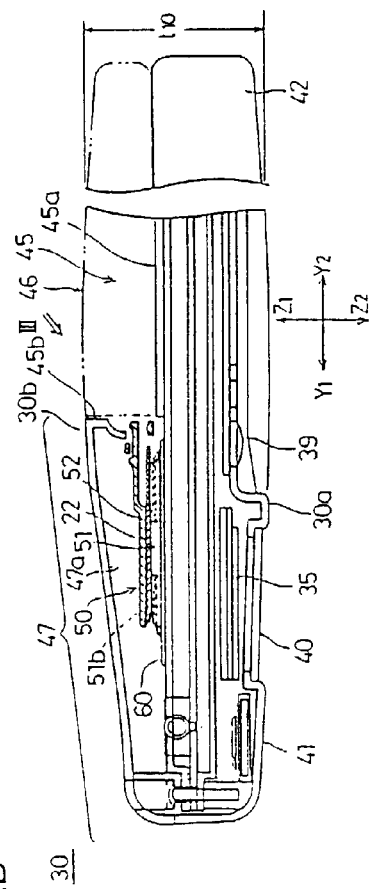
FIG. 2B is a cross-sectional view of the portable telephone set shown in FIG. 2A.
Figure 3:
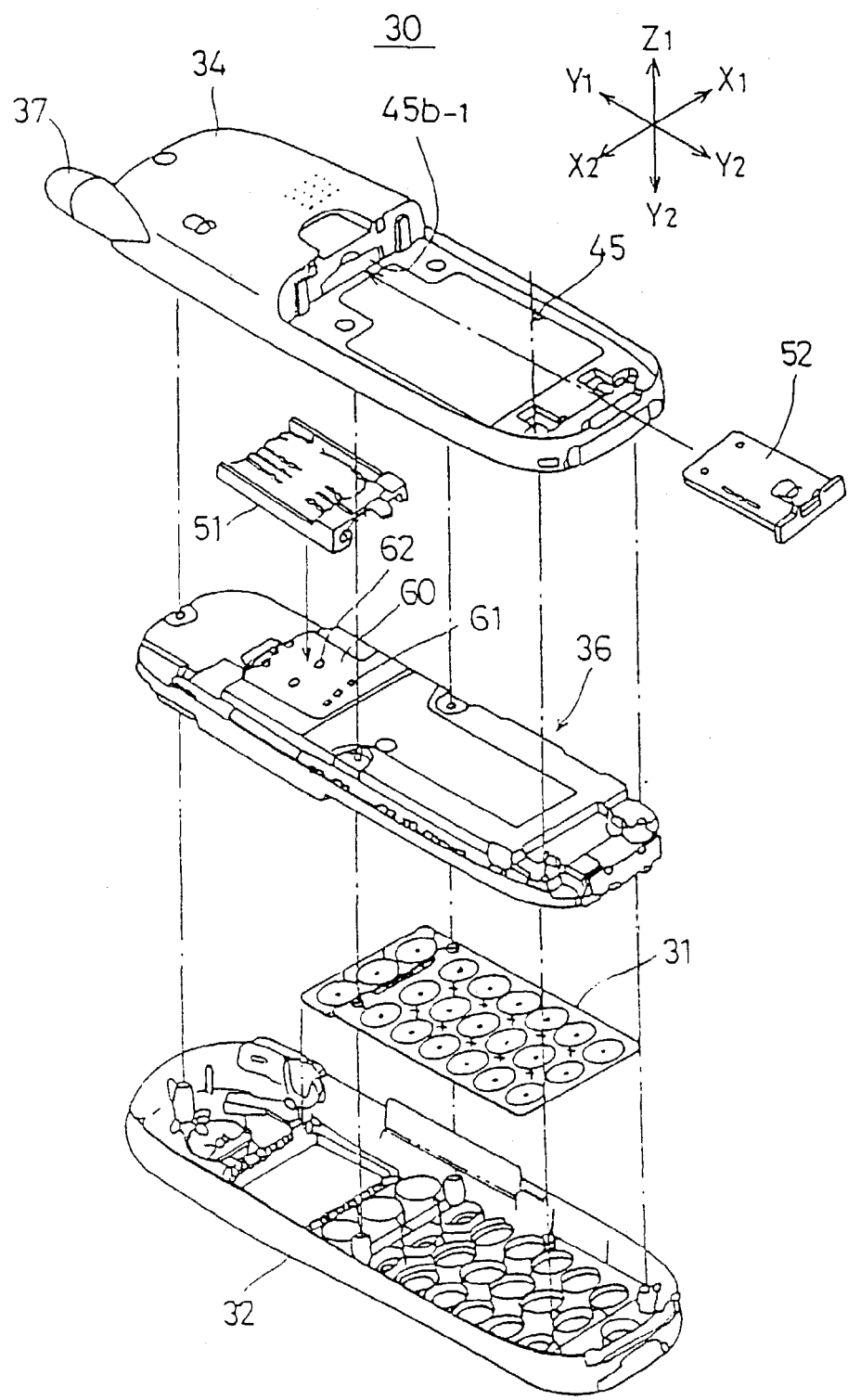
FIG. 3 is an exploded perspective view of the portable telephone set shown in FIGS. 2A and 2B.
Figure 4:
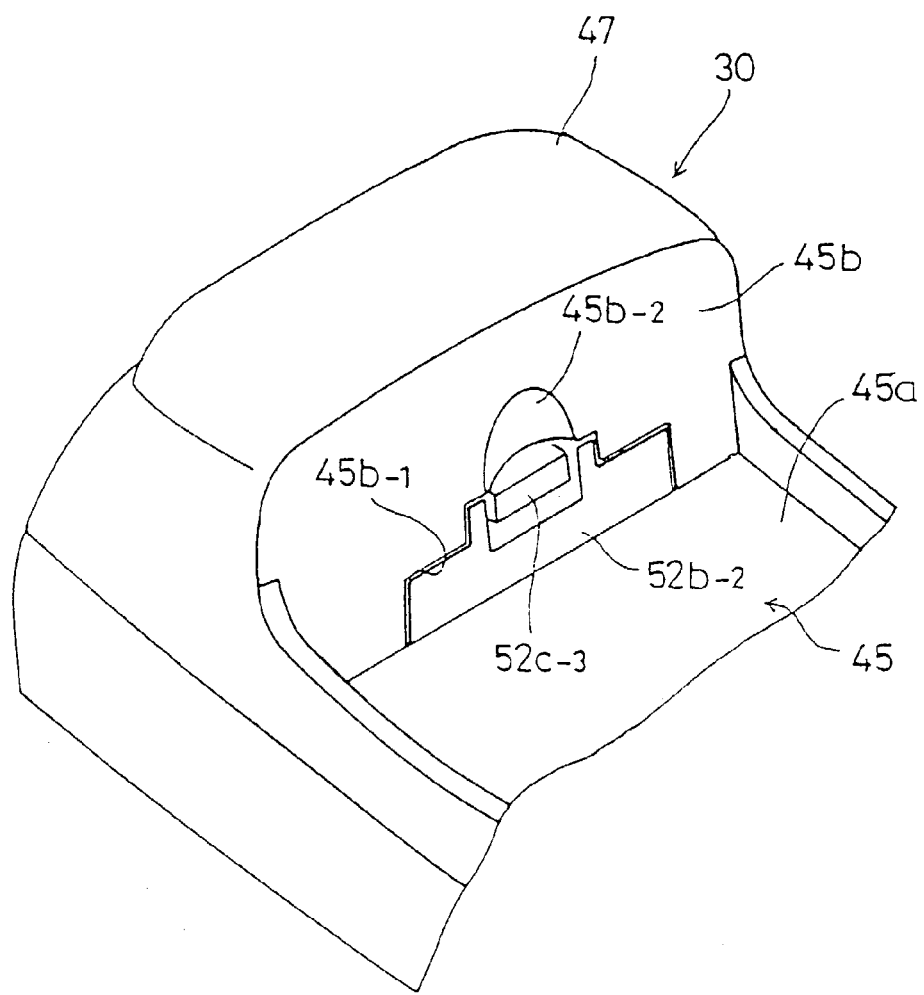
FIG. 4 is an enlarged perspective view taken along an arrow III shown in FIG. 2B.
Figure 5:
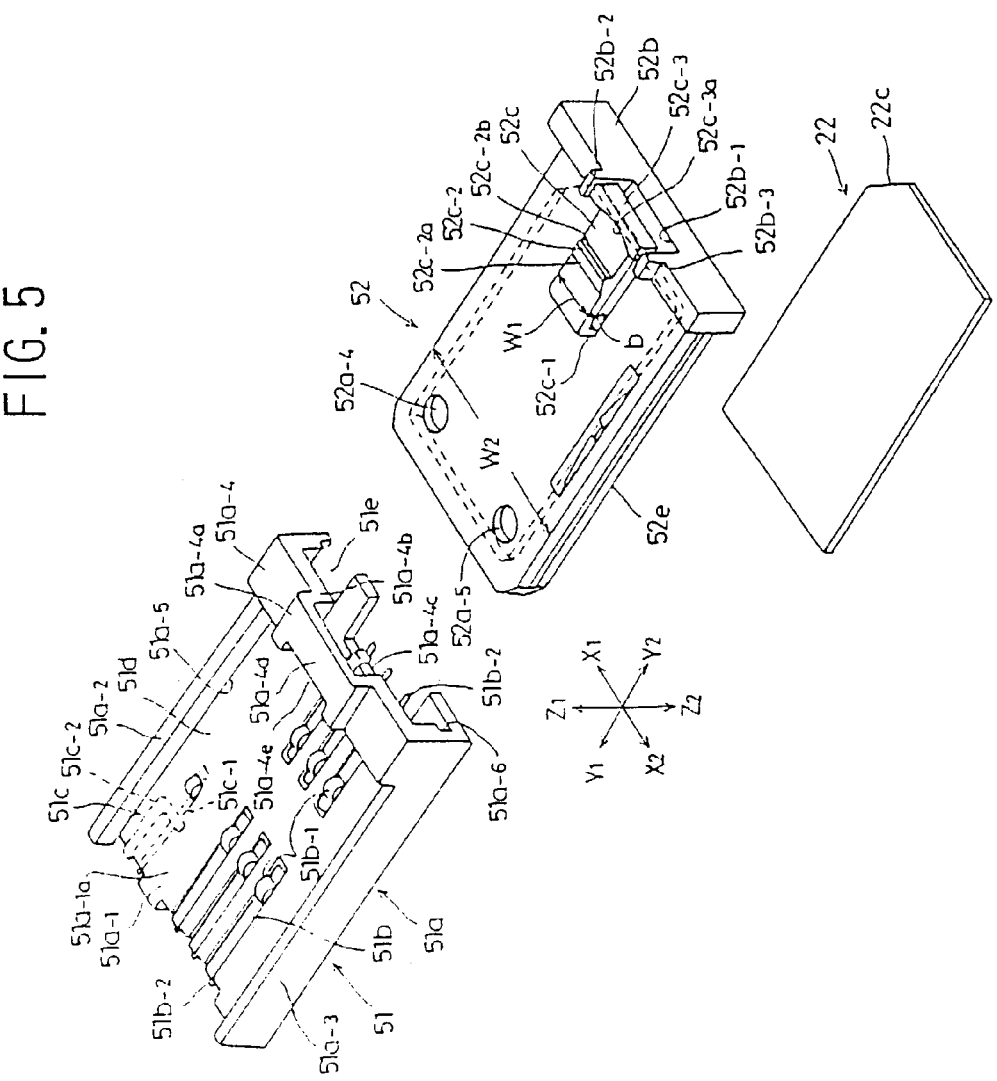
FIG. 5 is a perspective view of a subscriber identity card loading mechanism of the portable telephone set.

FIGS. 2A and 2B are diagrams of a portable telephone set 30 which can be applied to the GSM according to an embodiment of the present invention. Further, FIG. 3 is an exploded perspective view of the portable telephone set 30. FIG. 4 is an enlarged perspective view taken along arrow III shown in FIG. 2B.

The portable telephone set 30 has a front case 32 and a back case 34 between which a printed wiring board unit 36 is interposed. The whole case of the portable telephone set 30 includes the cases 32 and 34. The front case 32 is equipped with a key group sheet 31 on which a plurality of keys are arranged. The back case 34 is equipped with an antenna 37. The printed wiring board unit 36 is equipped with a liquid crystal unit 35. The front case 32, the rear case and the printed wiring board unit 36 are longitudinal in directions Y1 and Y2. A housing 51, which will be described in detail later, is attached to the printed wiring board unit 36. The portable telephone set 30 has a front surface facing in a direction Z1, and a back surface facing in a direction Z1.

A plurality of keys 39 are arranged in a front surface 30a of the portable telephone set 30 so that the keys 39 occupy an area located in a direction Y2 with respect to the center in the longitudinal direction. A display window 40 of the liquid crystal unit 35 and an acoustic output part 41 formed of a speaker are provided in an area located in a direction Y1 with respect to the keys 39. An acoustic input part 42 formed of a microphone is provided in the area located in the direction Y2 with respect to the key 39.

A battery pack mounting portion 45 is provided to the back surface 30b of the portable telephone set 30 and is located in the area extending in the direction Y2 from the center in the longitudinal direction. In other words, the battery pack mounting portion 45 is located in the portion corresponding to the arrangement of the keys 39. A battery pack 46 having a length approximately equal to half the length of the portable telephone set 30 is mounted on the battery pack mounting portion 45. The battery pack mounting portion 45 has a recess which causes the back surface 30b of the portable telephone set 30 with the battery pack 46 mounted to be a flat surface. A portion 47, which is adjacent to the battery pack mounting portion 45 in the longitudinal direction and totally occupies the whole located in the direction Y1 with respect to the battery pack mounting portion 45, has a projection projecting from a bottom surface 45a in the direction Z1. Hereinafter, the portion 47 will be referred to as a battery pack mount adjacent portion The interface between the battery pack mounting portion 45 and the battery pack adjacent portion 47 is a vertical wall 45b which stands upright in the direction Z1 from the bottom surface 45a. A card holder inserting opening 45-b is formed in a lower end portion of the vertical wall 45b. The lower side of the vertical wall 45b corresponds to the position in which the card holder insertion opening 45-b is formed. Hence, as will be described in detail later with reference to FIG. 10, when the card holder 52 is placed on the bottom surface 45a of the battery pack mounting portion 45 of the portable telephone set 30, the card holder 52 faces the card holder insertion opening 45-b.

The portable telephone set 30 has a subscriber identity card loading mechanism 50, which is provided in an inner space 47a of the battery pack mount adjacent portion 47. The mechanism 50 is built in the portable telephone set 30 without any increase in the thickness thereof because the battery pack mount adjacent portion 47 projects from the bottom surface 45a of the battery pack mounting portion 45, and is located in the area which has a larger spatial margin than the other area of the portable telephone set 30. Further, the size of the card loading mechanism 50 itself is small. The thickness of the portable telephone set 30, which is denoted as t10, is equal to that obtained when the card loading mechanism 50 is not installed.

A description will be given, with reference to FIGS. 5, 6 and 7A through 7E, of the structure of the subscriber identity card loading mechanism 50.

The card loading mechanism 50 includes the housing 51 and the card holder 52 which holds the subscriber identity card 22 and is attached to the housing 51. The card loading mechanism 50 has an upper surface facing in the direction Z1, a lower surface in the direction Z2, a front surface in the direction Y2, and a rear portion in the direction Y1. The width of the mechanism 50 extends in the directions X1 and X2.

Figure 6:
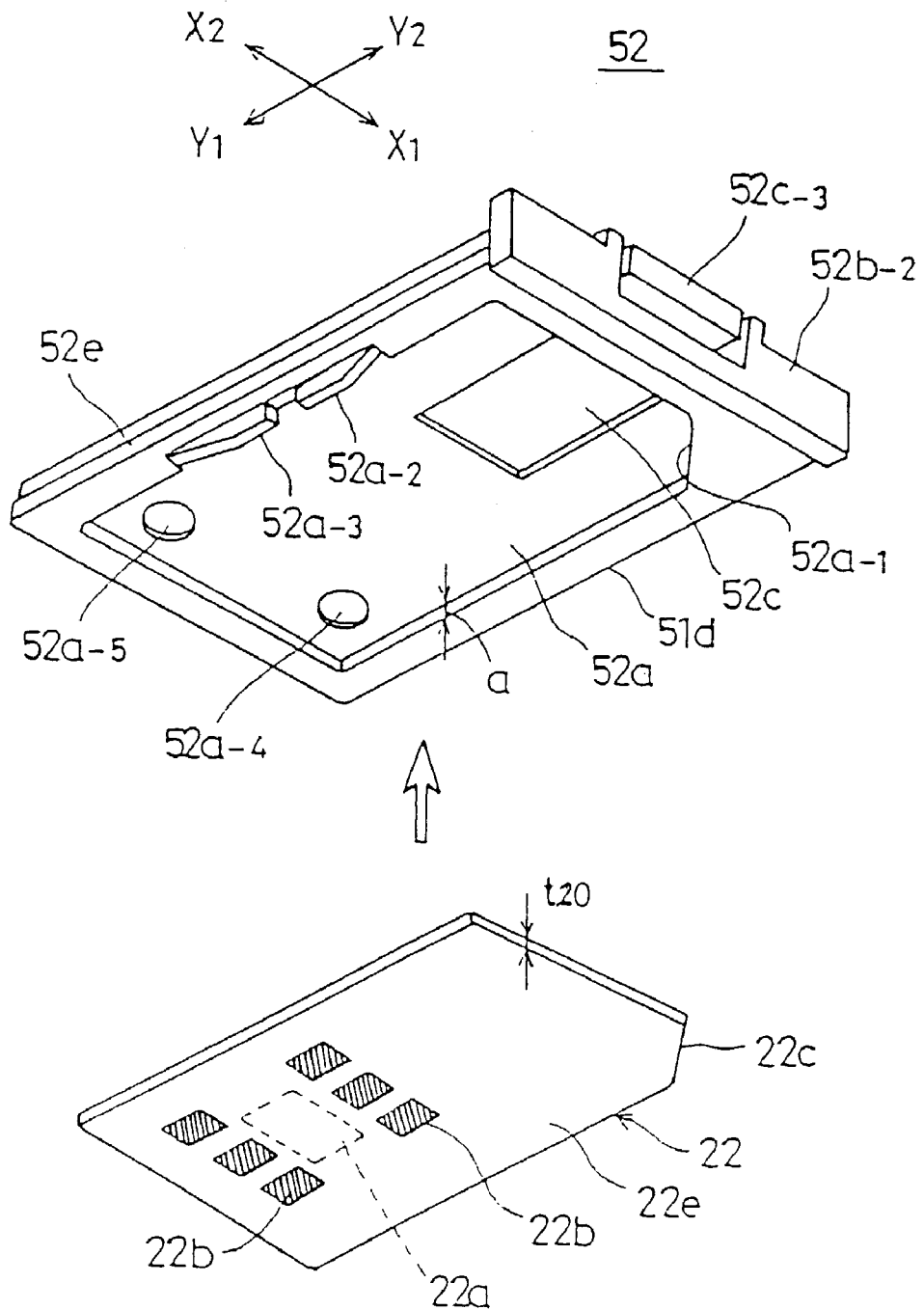
FIG. 6 is a perspective view of a card holder of the portable telephone set.

As shown in FIG. 6, the subscriber identity card 22 includes a built-in integrated circuit 22a and six electrodes 22b provided to the lower surface of the card 22. Further, the subscriber identity card 22 has a chamfered ewer corner 22c.

The card holder 52 is a synthetic resin molded component, and has a flat shape which is long in the directions Y1 and Y2. The card holder 52 includes a subscriber identity card accommodating portion 52a provided to the lower surface side, a front panel portion 52b, and a cantilever plate spring 52c provided to the upper surface side. Further, the card holder 52 has rail portions 52d and 52e which are provided to ends thereof located in the directions X1 and X2 and extend in the directions Y1 and Y2.

The subscriber identity card accommodating portion 52a has a size which corresponds to the subscriber identity card 22, and a depth "a" corresponding to the thickness t20 of the card 22 so that the card accommodating portion 52a has a flat recess shape into which the subscriber identity card can be accommodated. The card accommodating portion 52a includes a slant portion 52a-1, which corresponds to the chamfered corner 22c. Two plate springs 52a-2 and 52a-3 made of synthetic resin are provided to the end X2 of the card accommodating portion 52a so that the free ends thereof face each other and are arranged in a line in the directions Y1 and Y2. The plate springs 52a-2 and 52a-3 can be resiliently bent in the direction X2. The plate springs 52a-2 and 52a-3 function as subscriber identity card holding portions having a spring property. Further, holes 52a-4 and 52-5 for pushing out the subscriber identity card are formed in the vicinity of the ends of the bottom of the card accommodating portion 52a in the direction Y1.

The front panel portion 52b has a U-shaped cutout portion 52b-1 located at the center thereof. Protrusions 52b-2 and 52b-3 which protrude in the direction Z1 are provided on both sides of the U-shaped cutout portion 52b-1. The U-shaped cutout portion 52b-1 functions to accommodate a handle portion 52c-3 which will be described in detail later. The protrusions 52b-2 and 52b-3 come into contact with a counter U-shaped frame portion 51a-4a which will also be described later.

The cantilever plate spring 52c is integrally formed when molding the card holder 52, and is formed so that a portion of the upper surface of the card holder 52 in the width direction (in the directions X1 and X2) is cut and raised. The plate spring 52c has a width W1 that is approximately equal to ¼ of the width W2 of the card holder 52. The plate spring 52c has a root portion 52c-1 located in the center of the card holder 52 in the directions Y1 and Y2. The root portion 52c-1 stands upright by a distance "b" so that the remaining portion of the plate spring 52c horizontally extends to the front panel portion 52b in the direction Y2. The cantilever plate spring 52c has an engagement claw 52c-2 that is located in the center of the upper surface thereof and projects in the direction Z1. Further, the cantilever plate spring 52c has the handle portion 52c-3 located at the end thereof. The engagement claw 52c-2 has a slant surface 52c-2a in the direction Y1, and a vertical surface 52c-2b in the direction Y2. The handle portion 52c-3 has a recess portion 52c-3a on the upper surface oriented in the direction Y1. The recess portion 52c-3a makes it possible for the end of the forefinger of the hand of the operator to be easily engaged with the handle 52c-3. Further, the handle portion 52c-3 is located in the U-shaped cutout portion 52b-1 of the front panel portion 52b.

When the handle portion 52c-3 is pushed in the direction Z2, the cantilever plate spring 52c is bent and the engagement claw 52c-2 is thus displaced in the direction Z2. The cantilever plate spring 52c is located over the upper surface of the card holder 52 by the distance "b". Hence, even if the spring portion 52c is bent, it is not entered into the subscriber identity card accommodating portion 52a.

The housing 51 includes a housing main body 51a made of synthetic resin, a plurality of terminals 51b fixed to the housing main body 51a, and a detection switch 51c provided to the housing main body 51a. The housing 51 has a size greater than the card holder 52.

The housing main body 51a includes a bottom plate portion 51a-1, sidewall portions 51a-2 and 51a-3, and a counter U-shaped frame portion 51a-4. The sidewall portions 51a-2 and 52-3 which are located on both the sides of the housing main body 51a in the directions X1 and X2 and extend upwards in the direction Z1. The counter frame portion 51a-4 are located on both the sides in the direction Y2. Guide grooves 51a-5 and 51-6 are formed in the parts of the sidewall portions 51a-2 and 51a-3 which face the bottom plate portion 51a-1. A guard holder accommodating portion 51d is formed on the upper surface side of the bottom plate portion 51a-1. The guard holder accommodating portion 51d has a flat space partitioned by the sidewall portions 51a-2 and 51a-3. The counter U-shaped frame portion 51a-4 forms an entrance 51e to the card holder accommodating portion 51d. Two bosses 51a-1a and 51a-1b for defining the attachment position of the housing 51 are formed on the lower surface of the bottom plate portion 51a-1.

The counter U-shaped frame portion 51a-4 includes a central counter U-shaped frame portion 51a-4a, which is a step portion higher than the frame portion 51a-4. The portion 51a-4a is provided to allow the cantilever plate spring 52c of the card holder 52 to pass therethrough. Two upright portions 51a-4b and 51a-4c located on both sides of the frame portion 51a-4a receive the protrusions 52b-2 and 52b-3 when the card holder 52 is inserted. A cut portion 51a-4e having a U shape corresponding to the size of the engagement claw 52c-2 is formed in an end of the frame portion 51a-4a extending in the direction Y1. The frame portion 51a-4d functions as an engagement portion with which the engagement claw 52c-2 is engaged.

The six terminal members 51b are fixed to the upper surface 51a-1a of the bottom plate portion 51a-1. Arc-shaped terminal portions 51b-1 are respectively provided on the ends of the six terminal members 51b so as to correspond to the six electrodes 22b of the subscriber identity card 22. Terminal portions 51b-2 provided on the other ends of the six terminal members 51b extend outwards from the ends in the directions Y1 and Y2. The terminal portions 51b-2 have the same height as that of the lower surface 51a-1b of the bottom plate portion 51a-1.

Referring to FIG. 8A additionally, the detection switch 51c has a first contact member 51c-1 and an L-shaped second contact member 51c-2, and is normally closed. The first contact member 51c-1 and the second contact member 51c-2 are fixed to the lower surface 51a-1b of the bottom plate portion 51a-1. The first contact member 51c-1 has one end located in the direction Y1, which end is fixed, while the other end thereof can flexibly be bent. The first contact 51c-1 has a convex portion 51c-1a protruding in the direction Z1. More particularly, the convex portion 51c-1a slightly protrudes from the upper surface 51a-1a of the bottom plate portion 51a-1 via an opening window 51a-1c of the bottom plate portion 51a-1. The opening window 51a-1c (the convex portion 51c-1a) is disposed in a position in which the opening window 51a-1c is pushed by the subscriber identity card 22 held in the card holder 52 when the card holder 52 is inserted into the housing 51.

When the subscriber identity card 22 is not inserted into the card holder 52, the first contact member 51c-1 is in contact with the second contact member 51c-2, as shown in FIG. 8A. Hence, the detection switch 51c is maintained in the closed state.

As shown in FIG. 3, the printed wiring board unit 36 has a flexible printed circuit board used to attach the housing 51 thereto. The flexible printed circuit board 60 extending from the inside of the printed wiring board unit 36 is folded and adheres to the upper surface of the unit 36. A plurality of lands 61 are provided to the flexible printed circuit board 60 so as to have an arrangement which corresponds to the terminal portions 51b-2. Holes 62 are formed in the upper surface of the unit 36 and the board 60 so that the positions of the holes 62 correspond to those of the bosses 51a-1a and 51a-1b.

The housing 51 is positioned so that the bosses 51a-1a and 51a-1b are engaged with the holes 62. The terminal portions 51b-2 are soldered to the lands 61. Then, the housing 51 is mounted on the upper surface of the printed wiring board unit 36 so that the entrance 51e is oriented along the direction Y2.

The housing 51 can completely be accommodated in the battery pack mount adjacent portion 47, and the entrance 51e faces a card holder insertion opening 45b-1 of the vertical wall 45b in the state in which the printed wiring board unit 36 is covered by the front case 32 and the back case 34.

As shown in FIG. 4, a finger inserting recess portion 45b-2 is formed in the vertical wall 45b in addition to the card holder insertion opening 45b-1, which opening has a shape corresponding to the front panel portion 52b of the card holder 52. The finger inserting recess portion 45b-2 makes it easy for the forefinger of the operator to engage with the handle portion 52c-3. The finger inserting recess portion 45b-2 is located just above the card holder insertion opening 45b-1, and is recessed in the direction Y1 so that the degree of recess is increased in the direction Z2.

In the state in which the card holder 52 is accommodated in the housing 51, as shown in FIG. 4, the front panel portion 52b is stayed in the card holder insertion opening 45b-1, and the handle portion 52c-3 projects from the lower end of the finger inserting recess portion 45b-2.

Next, a description will be given of a procedure and operation to be carried out when the operator who rents a portable telephone set inserts his or her own subscriber identity card 22 therein.

The above procedure is comprised of the following first to fifth steps. The first step is to detach the battery pack 46 from the portable telephone set 30. The second step is to take out the card holder 52 having no card. The third step is to insert the own subscriber identity card 22 into the card holder 52. The fourth step is to load the card holder 52 with the card 22 inserted therein to the housing 51. The fifth step is to attach the battery pack 46.

The above first to fifth steps will be described in more detail below.

In the first step, the battery pack 46 is detached from the portable telephone set 30. Hence, as shown in FIG. 4, the handle portion 52c-3 is exposed.

Figure 9:
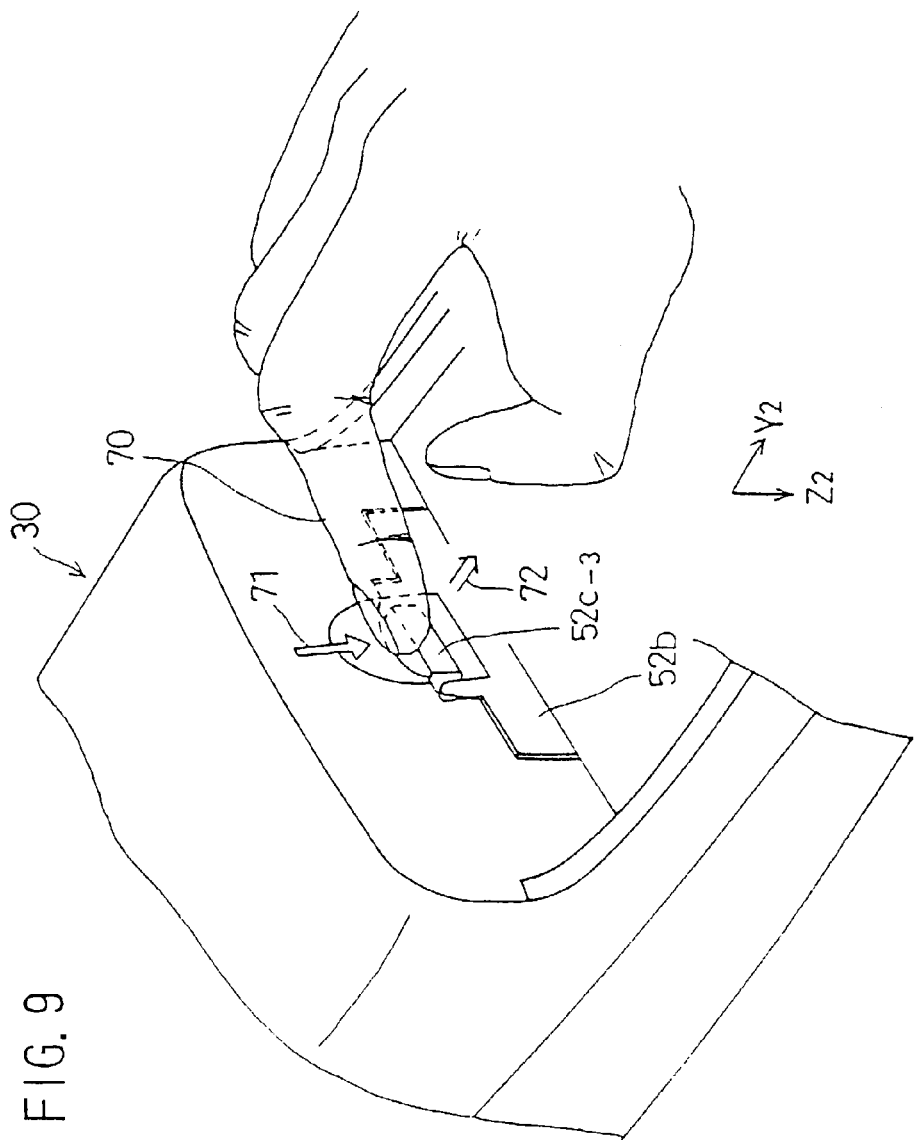
FIG. 9 is an enlarged perspective view showing an operation of drawing the card holder from the portable telephone set.

In the second step, the card holder 52 having no card is drawn and taken out. As shown in FIG. 9, a forefinger 70 is inserted into the finger insertion recess portion 45b-2. Then, as indicated by an arrow 71, the handle portion 52c-3 is pressed in the direction Z2, and is thereafter drawn in the direction Y2 as indicated as indicated by an arrow 72. In the operation of pressing the handle portion 52c-3 in the direction Z2, as shown in FIG. 7D, the cantilever plate spring 52c is bent in the direction Z2, and the engagement craw 52c-2 is disengaged from the central counter U-shaped frame portion 51a-4a. Hence, the card holder 52 is released from the locked state in which it is locked to the housing 51. The forefinger 70 strongly engages with the recess portion 52c-3a of the handle portion 52c-3. In the subsequent operation, the craw portion 52c-2 passes below the frame portion 51a-4a, so that the card holder 52 is drawn to the outside of the housing 51.

As described above, the card holder 52 can be drawn by the operation of only the forefinger.

In the third step, the subscriber identity card 22 of the operator is inserted in the card holder 52. The card 22 is lightly pushed in the subscriber identity card accommodating portion 52a in the direction reverse to the direction shown in FIG. 6A so that the card accommodating portion 52a faces up. hence, the plate springs 52a-2 and 52a-3 are resiliently bent, so that the card 22 is loaded to the card holder 52. In this state, the card holder 52 is detached from the portable telephone set 30. Hence, it is very easy for the operator to load his or her own subscriber identity card 22 to the subscriber identity card accommodating portion 52a.

The card 22 can be correctly loaded to the card holder 52 due to the function of the chamfered portion 22c of the card 22 and the slant portion 52-1 of the card accommodating portion 52a. The card 22 is pushed in the single direction by the plate springs 52a-2 and 52a-3. Hence, even when the card holder 52 is turned reversely so that the card accommodating portion 52a faces down, the card 22 does not drop off.

In the fourth step, the card holder 52 is inserted into and loaded to the housing 51.

Figure 10:
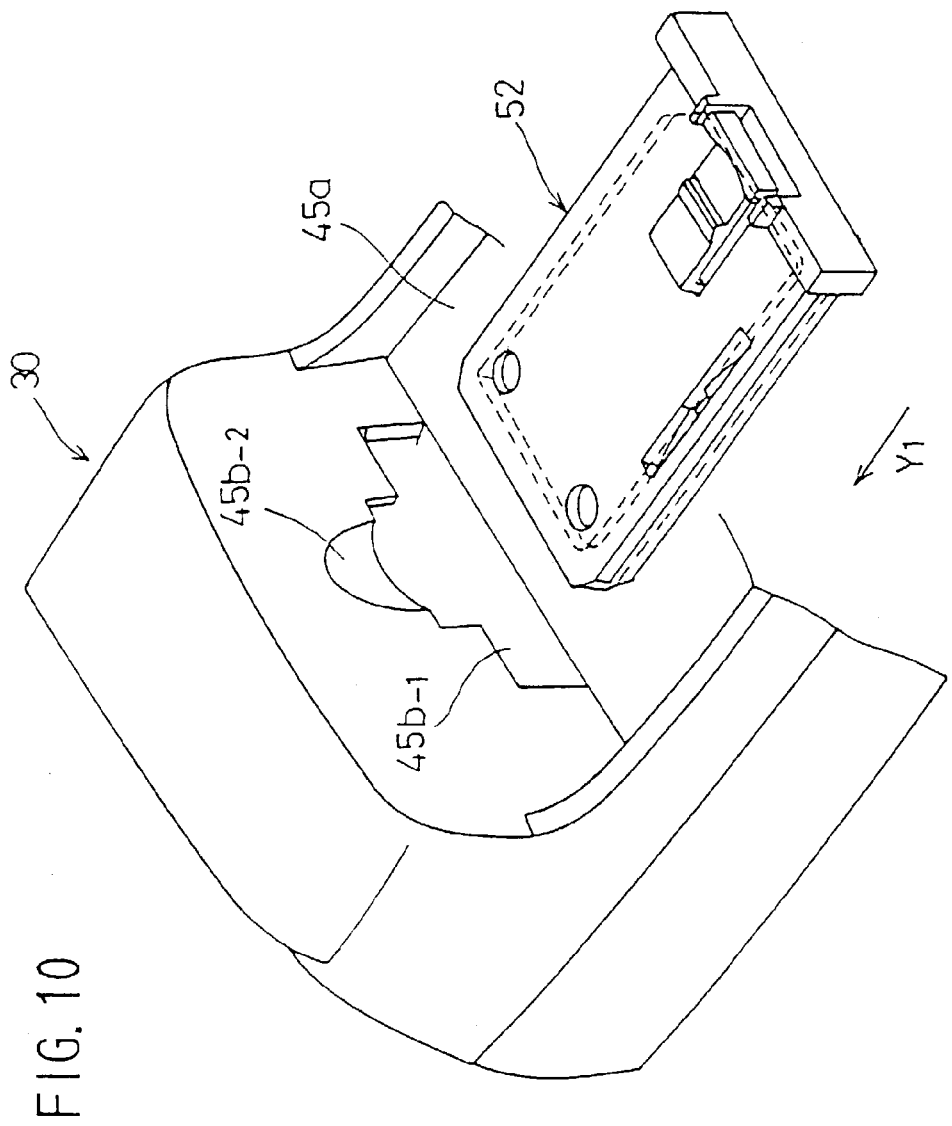
FIG. 10 is an enlarged perspective view showing an operation of loading the card holder

As shown in FIG. 10, the card holder 52 is placed on the bottom surface 45a of the battery pack loading portion 45 of the portable telephone set 30 so that the card holder 52 faces the card holder insertion opening 45b-1. Then, the card holder 52 is made to slide in the direction Y1 so that it passes through the card holder insertion opening 45b-1. Hence, the card holder 52 is inserted into the housing 51. When the card holder 52 is placed on the bottom surface 45a of the battery pack mounting portion 45, the card holder 52 faces the card holder insertion opening 45b-1. This arrangement facilitates the operation of orienting the card holder 52 toward the card holder insertion opening 45b-1, so that the card holder 52 can easily be loaded to the housing 51.

The card holder 52 is guided and regulated in the directions X1, X2, Z1 and Z2 so that the rail portions 52d and 52e engages with the guide grooves 51a-5 and 51a-6 of the housing 51. As shown in FIG. 4, the card holder 52 is inserted until the handle portion 52c-3 is engaged with the card holder insertion opening 45b-1.

The card holder 52 is prevented from moving in the direction Z1 because the rail portions 52d and 52e engage with the guide grooves 51a-5 and 51a-6. The subscriber identity card 22 is prevented from moving in the direction Z1 due to the function of the card holder 52. Hence, the subscriber identity card 22 cannot move in the direction Z1.

As shown in FIG. 7E, when the engagement craw 52c-2 comes into contact with the central counter U-shaped frame portion 51a-4a, the slant surface 52c-2 is guided by the frame portion 51a-4a, and the cantilever plate sprint 52c is resiliently bent in the direction Z2. Hence, the engagement craw 52c-2 enters below the frame portion 51a-4a. In other words, the card holder 52 can be inserted into the housing 51 by merely pushing the card holder 52 in the direction Y2 rather than specially depressing the handle portion 52c-3. This also makes it easy to load the card holder 52 to the housing 51.

When the card holder 52 is inserted into the final position of the housing 51, the engagement craw 52c-2 passes through the central counter U-shaped frame portion 51a-4a, and the cantilever plate spring 52c is resiliently returned to the original state. Further, the vertical surface 52c-2b of the engagement craw 52c-2 engages with the frame portion 51a-4a. Thus, the card holder 52 is locked to the housing 51 and is prevented from being detached therefrom.

When the card holder 52 is inserted into the final position of the housing 51, the six electrodes 22b of the subscriber identity card 22 come into contact with the six arc-shaped terminal portions 51b-1. As shown in FIG. 8B, the lower surface 22e of the subscriber identity card pushes down the convex portion 51c-1a. Hence, the first contact member 51c-1 is detached from the second contact member 51c-2 and the detection switch 51c is opened. Information which indicates that the subscriber identity card 22 has been loaded to the card holder 52 is supplied to a given circuit of the portable telephone set 30. As has been described previously, the subscriber identity card 22 cannot move in the direction Z1. Hence, the contacts between the electrodes 22b and the terminal portions 51b-1 can be definitely established and the detection switch 51c can be definitely closed.

In the fifth step, the battery pack 46 is attached to the portable telephone set 30. In this state, the portable telephone set 30 is switched to a state in which the owner of the subscriber identity card 22 can be identified. Since the detection switch 51c is opened, the portable telephone set 30 operates normally. In the state in which the battery pack 46 is attached to the portable telephone set 30, the handle portion 52c-3 is hidden by the battery pack 46. Hence, the subscriber identity card 22 cannot be detached from the portable telephone set 30 in the state in which the battery pack 46 is attached thereto. As a result, there is no possibility that the subscriber identity card 22 happens to be detached from the portable telephone set 30.

The detection switch 51c is closed in the state in which the card holder 52 with no card is loaded to the portable telephone set 30, which is not thus operated. Hence, it is possible to prevent the occurrence of the wasteful calling procedure which is encountered in the prior art.

The card holder 52 with the card 22 attached can be detached as described above. As shown in FIG. 7C, the cantilever plate spring 52c is located, by a relatively large distance "c", above the upper surface of the subscriber identity card 22 loaded to the card holder 52. Hence, even if the cantilever plate spring 52 is bent downwards, it cannot come into contact with the subscriber identity card 22, and hence the engagement craw 52c-2 can be certainly detached from the central counter U-shaped frame portion 51a-4a. Hence, the subscriber identity card 22 is detached from the card holder 52, the card 22 is pushed by a tip end of a ballpoint pen or the like, which is inserted in the hole 52a-4 and/or 52a-5. Hence, the subscriber identity card 22 can easily be detached.

A description will now be given of another subscriber identity card loading mechanism 50A by referring to FIGS. 11A, 11B, 11C, 12, 13, 14A, 14B and 14C.

The subscriber card loading mechanism 50A includes a housing 51A and a card holder 52A, which holds the subscriber identity card 22 and is loaded to the housing 51A. The subscriber card loading mechanism 50A has a structure in which the card holder 52A has handle portions located on sides X1 and X2. The other portions of the card loading mechanism 50A are the same as corresponding those of the card loading mechanism 50.

Figure 13A:
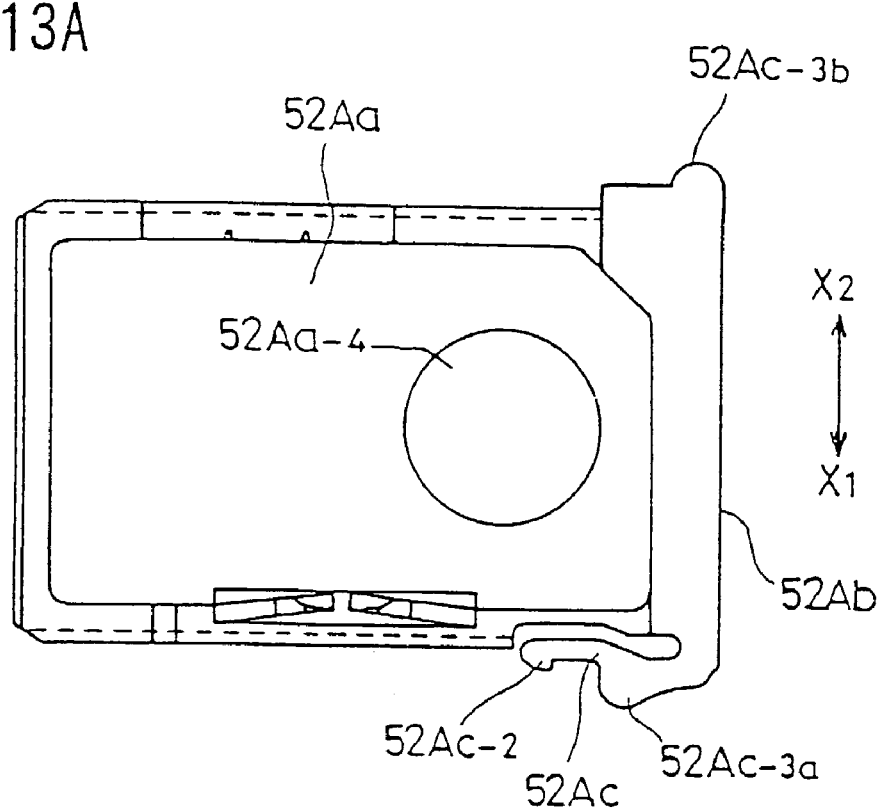
FIGS. 13A and 13B are diagrams of a card holder.
Figure 13B:
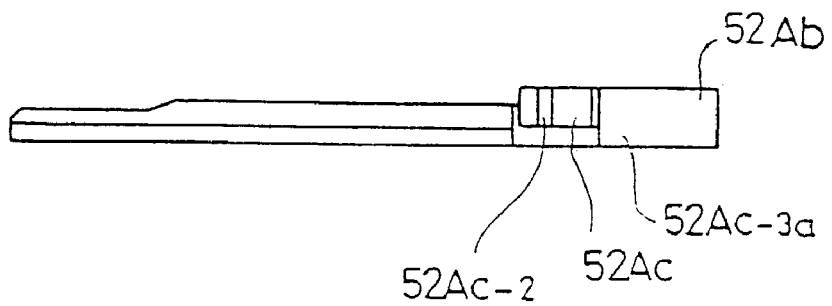

As shown in FIG. 13A, handle portions 52Ac-3A and 52Ac-3b are provided on the sides X1 and X2 of a front panel portion 52Ab. The handle portion 52Ac-3a is provided to a spring portion 52Ac, which has an engagement craw 52Ac-2 located at the tip end of the spring portion 52Aa. Further, the spring portion 52Aa is resiliently bent in the width direction of the portable telephone set 30A. The card holder 52A is inserted so that the rail portions are guided by guide grooves of the housing 51A. The engagement craw 52Ac-2 engages with a recess portion 51Ab of the housing 51A.

Figure 12:
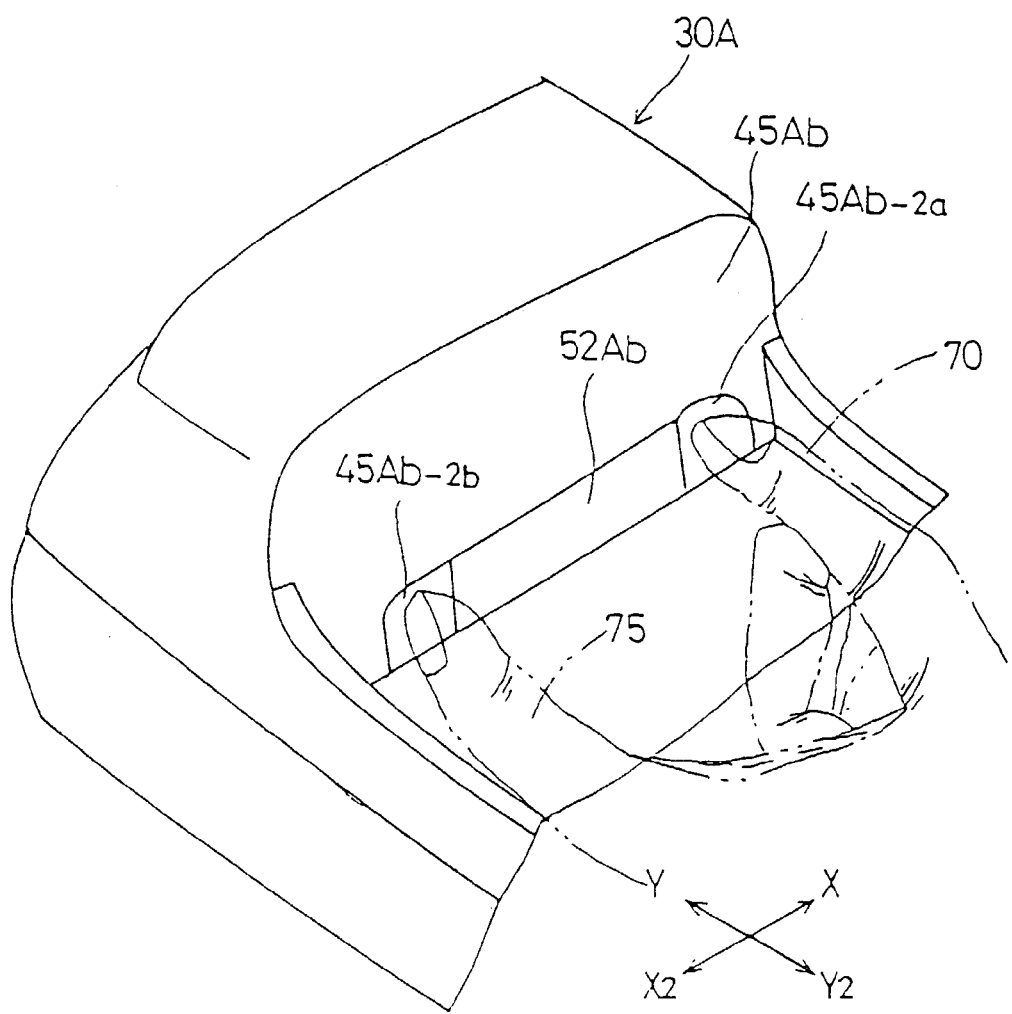
FIG. 12 is an enlarged perspective view of a state in which the subscriber identity card loading mechanism is installed in the portable telephone set.

As shown in FIG. 12, a card holder insertion opening 45Ab-1 is formed in a vertical wall 45Ab of a battery pack mounting portion 45A of the portable telephone set 30A. Further, finger insertion recess portions 45Ab-2a and 45Ab-2b are formed on the sides X1 and X2 of the card holder insertion opening 45Ab-1.

A thumb finger 75 is inserted into the recess portion 45Ab-2b, and the forefinger 70 is inserted into a finger insertion opening 45Ab-2*ba*. Then, the handle portions 52Ac-3*a* and 52Ac-3*b* are slightly gripped, and the spring portion 52Ac is bent so that the engagement craw 52Ac-2 is drawn from the recess portion 51Ap. In this state, the card holder 52A is drawn in the direction Y2, and is finally detached from the housing 51A. In the above manner, the card holder 52A can be drawn to the table while gripping the handle portions 52Ac-3*a* and 52Ac-3*b* without gripping again.

The operation steps of the subscriber identity card loading mechanism 50A are the same as those of the mechanism 50, and a description thereof will be omitted.

Figure 15A:
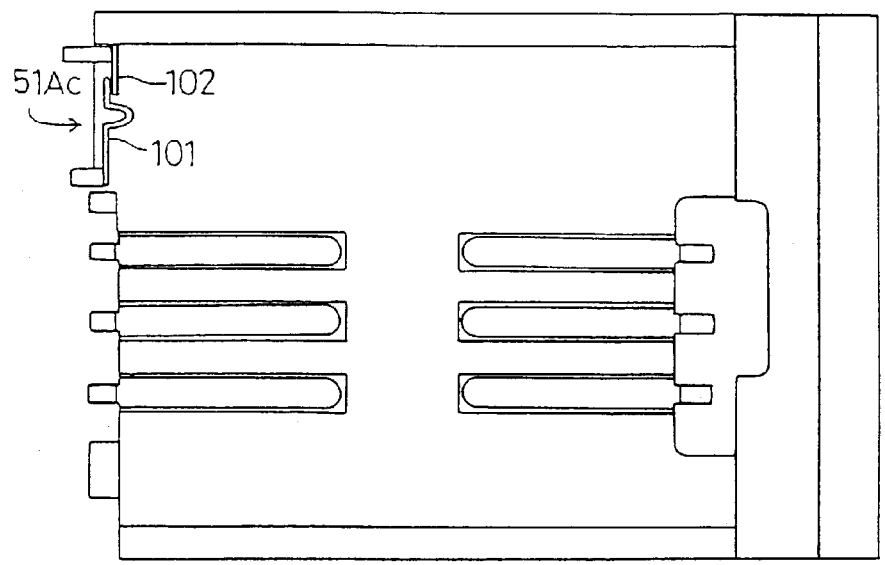
FIGS. 15A, 15B and 15C are diagrams of another detection switch.
Figure 15B:
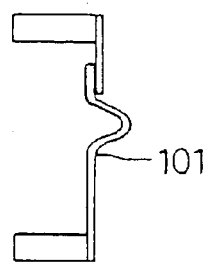
Figure 15C:
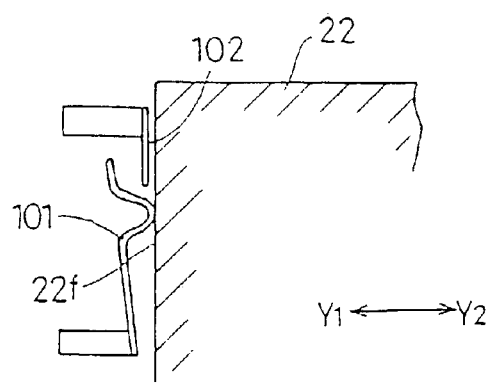

FIGS. 15A, 15B and 15C show a variation of the detection switch 51*c*. A detection switch 51Ac shown in these figures includes a first contact member 101 and a second contact member 102. As shown in FIGS. 15A and 15B, the detection switch 51Ac is normally maintained in the closed state, and is located at an end of the subscriber identity card loading mechanism 50 in the direction Y1. As shown in FIG. 15C, the detection switch 51Ac is pushed by the end surface 22*f* of the subscriber identity card 22 located in the direction Y1 and is thus opened when the card holder with the card 22 loaded thereto is loaded to the housing.

The detection switch 51Ac provided in the end of the mechanism in the direction Y1 is attractive when the subscriber identity card has a large number of electrodes, for example, eight electrodes, and a large number of terminal members is required to be formed on the bottom of the housing.

The above-mentioned embodiments of the present invention are directed to the use of the subscriber identity card. However, the present invention is not limited to the subscriber identity card, and includes any card in which information is stored.

The present invention is not limited to the specifically disclosed embodiments, and variations and modifications may be made without departing from the scope of the present invention.

What is claimed is:

1. A portable telephone, comprising:
a battery loading part; and
a card holding portion, wherein
said card holding portion is provided in such a manner that a card held by said card holding portion is placed such that the card is not sandwiched between a battery mounted in said battery loading part and a circuit board or a keypad; and
said card holding portion has a card holding space for holding said card and a front panel disposed to be inserted and sandwiched between an end of said card and said battery so that a distance between said end of said card facing said battery and said battery is longer than a distance between said front panel and said battery.

2. The portable telephone of claim 1, wherein
upon inserting said card into said portable telephone, said card does not overlap with said battery loading part in a longitudinal direction.

3. The portable telephone of claim 1, further comprising:
a battery accommodating portion that accommodates said battery loading part and said battery, wherein
upon inserting said card into said card holding portion said card does not overlap with said battery accommodating portion.

4. The portable telephone of claim 1, further comprising:
a stopping mechanism which, upon inserting said card into said card holding portion, stops said card in said card holding portion when said card does not overlap with said battery accommodating portion in a longitudinal direction.

5. The portable telephone of claim 1, further comprising:
a stopping mechanism which, upon inserting the card into the portable telephone, stops the card in the portable telephone when the card does not overlap with said battery loading part.

6. The portable telephone of claim 1, further comprising:
a detection switch which detects when said card is inserted into the portable telephone.

7. The portable telephone of claim 1, wherein said card includes a card holding part having an engagement claw which can engage with a part of the portable telephone when said card holding part is inserted into the portable telephone, and a handle portion with which a finger can be employed to disengage said engagement claw.

8. A portable telephone comprising:
a battery loading portion; and
a card holding portion, wherein:
said card holding portion is provided in such a manner that a card held by said card holding portion is placed such that the card is not sandwiched between a battery mounted in said battery loading part and a circuit board or a keypad, and
said card holding portion has a card holding space and a front panel disposed to be inserted and sandwiched between an end of said card and said battery so that a distance between said end of said card facing said battery when said card is inserted into the card holding portion and said battery is longer than a distance between said front panel and said battery.

9. The portable telephone of claim 8, wherein said card is an operable element of said portable telephone.

10. A portable telephone comprising:
a battery;
a battery loading portion holding said battery;
a card; and
a card holding portion holding said card, wherein:
said card is placed such that the card is not sandwiched between said battery and a circuit board or a keypad,
said battery is loaded on the battery loading portion without being in contact with said card,
a wall is provided such that, when said card is held in said card holding portion and said battery is mounted in said battery loading part, said wall is located at a position nearer to said battery than an end of said card nearest to said battery to prevent said battery from moving toward said card, and
said card holding portion has a card holding space for holding said card and a front panel disposed to be inserted and sandwiched between an end of said card and said battery so that a distance between said end of said card facing said battery and said battery is longer than a distance between said front panel and said battery.

11. A portable telephone comprising;
a first portion attaching a battery thereto; and
a second portion having an opening for placing a card such that the card is not sandwiched between the battery attached to the first portion and a keypad or circuit board, said battery attached without being in contact with said card, wherein
a wall is provided such that, when said card is placed in said second portion and said battery is attached to said first portion, said wall is located at a position nearer to said battery than an end of said card nearest to said battery to prevent said battery from moving toward said card, and said second portion has a card holding space for holding said card and a front panel disposed to be inserted and sandwiched between an end of said card and said battery so that a distance between said end of said card facing said battery and said battery is longer than a distance between said front panel and said battery.

12. A portable telephone set of claim 11, wherein the opening opposes to the battery attached to the first portion.

13. A portable telephone comprising:
a battery;
a battery loading portion to hold said battery; and
a card insertion portion to store a card,
wherein:
said card is placed such that said card is not sandwiched between said battery and a keypad or circuit board and said card is spaced apart from said battery when said card is placed into said card insertion portion and said battery is loaded on said battery loading portion,
a wall is provided such that, when said card is stored in said card insertion portion and said battery is held in said battery loading portion, said wall is located at a position nearer to said battery than an end of said card nearest to said battery to prevent said battery from moving toward said card, and
said card insertion portion has a card holding space for holding said card and a front panel disposed to be inserted and sandwiched between an end of said card and said battery so that a distance between said end of said card facing said battery and said battery is longer than a distance between said front panel and said battery.

14. A portable telephone according to claim 13, wherein said card is spaced apart from said battery by a card holding part.

15. A portable telephone according to claim 14, wherein said card holding part is placed between said card and said battery.

16. A portable telephone according to claim 15, wherein said card holding part covers a side of said card.

17. A portable telephone according to claim 16, wherein said card holding part covers the side entirely.

18. A portable telephone according to claim 14, wherein said card holding part is placed along a plane of insertion and removal of said card.

19. A portable telephone according to claim 14, wherein said card holding part includes a locking mechanism to prevent ejection of said card.

* * * * *

UNITED STATES PATENT AND TRADEMARK OFFICE
CERTIFICATE OF CORRECTION

PATENT NO. : 7,925,301 B2
APPLICATION NO. : 10/414449
DATED : April 12, 2011
INVENTOR(S) : Hiroshi Kubo Page 1 of 1

It is certified that error appears in the above-identified patent and that said Letters Patent is hereby corrected as shown below:

On the Title Page, item (62) should read as follows:

Item --(62)   Related U.S. Application Data

Division of application No. 09/518,827, filed on Mar. 6, 2000, now Pat. No. 6,580,923, which is a division of application No. 09/017,395, filed on Feb. 2, 1998, now Pat. No. 6,101,372.--

Signed and Sealed this
Twenty-third Day of August, 2011

David J. Kappos
*Director of the United States Patent and Trademark Office*